United States Patent
Lee et al.

(10) Patent No.: US 8,909,377 B2
(45) Date of Patent: Dec. 9, 2014

(54) METHOD AND SYSTEM FOR CONTROLLING DRIVING OF WEARABLE ROBOT

(75) Inventors: Seok Won Lee, Hwaseong-si (KR); Woo Sung Yang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 190 days.

(21) Appl. No.: 13/527,160

(22) Filed: Jun. 19, 2012

(65) Prior Publication Data

US 2013/0173059 A1 Jul. 4, 2013

(30) Foreign Application Priority Data

Jan. 2, 2012 (KR) .................. 10-2012-0000024

(51) Int. Cl.
*A61H 36/00* (2006.01)

(52) U.S. Cl.
USPC .......................................... 700/261; 600/587

(58) Field of Classification Search
USPC .................. 700/245, 261; 601/5, 23, 27–35; 600/587, 595
See application file for complete search history.

(56) References Cited

U.S. PATENT DOCUMENTS

| | | | |
|---|---|---|---|
| 8,585,620 B2* | 11/2013 | McBean et al. | .................... 601/5 |
| 2012/0179075 A1* | 7/2012 | Perry et al. | ..................... 601/33 |

FOREIGN PATENT DOCUMENTS

| | | |
|---|---|---|
| JP | 08-202454 | 8/1996 |
| KR | 10-2010-0022983 A | 3/2010 |

* cited by examiner

*Primary Examiner* — Dalena Tran
(74) *Attorney, Agent, or Firm* — Morgan, Lewis & Bockius LLP

(57) ABSTRACT

A system for controlling driving of a wearable robot may include a drive unit for operating a drive joint of the robot, a measurement unit for measuring an actual angle and an actual angular velocity of the drive joint in the robot, a sensing unit for determining a human torque applied by a wearing user to the drive joint, and a control unit for determining a target angular velocity of the robot by applying the determined human torque to an admittance model and for determining a required torque that may be input to the drive unit of the robot by applying an optimal control gain to a difference between the target angular velocity and the actual angular velocity of the robot.

2 Claims, 1 Drawing Sheet

METHOD AND SYSTEM FOR CONTROLLING DRIVING OF WEARABLE ROBOT

CROSS-REFERENCE TO RELATED APPLICATIONS

The present application claims priority to Korean Patent Application No. 10-2012-0000024 filed on Jan. 2, 2012, the entire contents of which is incorporated herein for purposes by this reference.

BACKGROUND OF THE INVENTION

1. Field of the Invention

The present invention relates to a method and system for controlling the driving of a wearable robot, which performs natural and soft motions by minimizing the resistance reaction of the robot.

2. Description of Related Art

In dermoskeleton-type wearable robots, it is very important to incorporate in real time a human being's intention to move in order to minimize the resistance reaction of the robots and perform motions naturally.

In addition, in order for such a robot to promptly react to a human being's initial intention to move, an algorithm for enhancing the driving sensitivity of the robot is required.

However, most existing wearable robots have adopted an algorithm that calculates a joint torque on a force applied by a user and then drives the robot. In this case, when a robot is initially driven, a great resistance reaction is caused by the inertia of the robot or the like and this is returned to the human being.

In order to eliminate this disadvantage, a methodology is required that can enhance the sensitivity of the robot's reaction to the user's intention while minimizing a resistance reaction felt by the user as caused by the robot.

Therefore, a technological concept is required that would be able to incorporate into an existing scheme a phenomenon in which the robot is currently moving, operate the joint of the robot using the corrected input, and then softly control the joint of the robot in conformity with the wearing user's intention to move, as well as the existing scheme that simply measures a force applied by a wearing user to the robot, converts the force into a torque, and operates the joint of the robot based on the torque.

The foregoing is intended merely to aid in the better understanding of the background of the present invention, and is not intended to mean that the present invention falls within the purview of the related art that is already known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and system for controlling the driving of a wearable robot, which performs natural and soft motions by minimizing the resistance reaction of the robot.

In an aspect of the present invention, a method of controlling driving of a wearable robot, may include a) determining a human torque of a wearing user that is applied to the robot, b) determining a target angular velocity of the robot using the human torque, based on an admittance model, and c) determining a required torque that is input to a drive unit of the robot by applying an optimal control gain to a difference between the target angular velocity and a current actual angular velocity of the robot.

The step a) is configured to measure a force applied by the wearing user to the robot and convert the measured force into the human torque applied to a drive joint of the robot.

In step b) the human torque that is applied to a drive joint of the robot is used as an input of the admittance model and the target angular velocity of the drive joint of the robot is used as an output of the admittance model.

The method may further include d) step operating a drive joint of the robot using both a driving force based on the required torque input to the drive joint of the robot and the human torque applied by the wearing user, after c) step.

In another aspect of the present invention, a system for controlling driving of a wearable robot, may include a drive unit for operating a drive joint of the robot, a measurement unit for measuring an actual angle and an actual angular velocity of the drive joint in the robot, a sensing unit for determining a human torque applied by a wearing user to the drive joint, and a control unit for determining a target angular velocity of the robot by applying the determined human torque to an admittance model and for determining a required torque that is input to the drive unit of the robot by applying an optimal control gain to a difference between the target angular velocity and the actual angular velocity of the robot.

The control unit may operate the drive joint of the robot using both a driving force based on the required torque input to the drive joint of the robot and the human torque applied by the wearing user.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
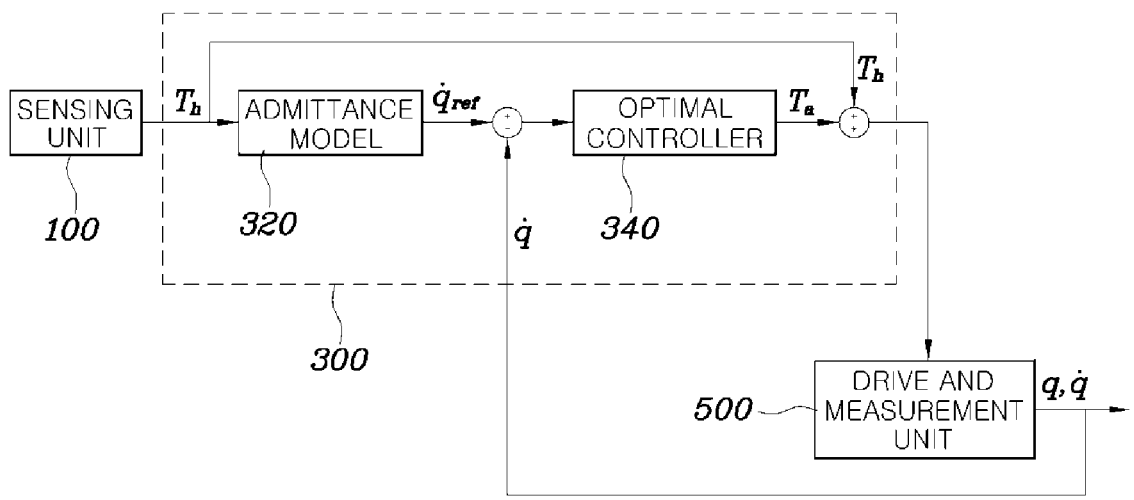
FIG. 1 is a diagram showing the construction of a system for controlling the driving of a wearable robot according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a method and system for controlling the driving of a wearable robot according to embodiments of the present invention will be described in detail with reference to the attached drawings.

Figure 2:
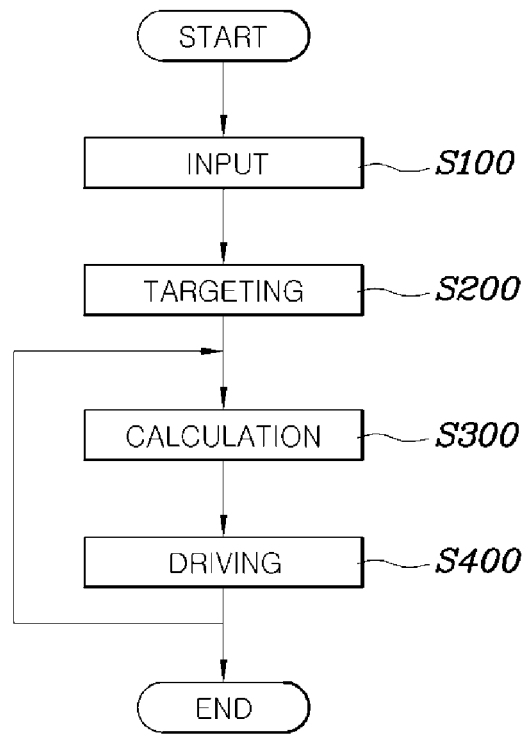
FIG. 2 is a flowchart showing a method of controlling the driving of a wearable robot according to an exemplary embodiment of the present invention.

FIG. 2 is a flowchart showing a method of controlling the driving of a wearable robot according to an exemplary embodiment of the present invention. The method of controlling the driving of the wearable robot according to an exemplary embodiment of the present invention includes the input step S100 of calculating the human torque of a wearing user applied to the robot, the targeting step S200 of deriving the target angular velocity of the robot using the human torque on the basis of an admittance model, and the calculation step S300 of applying an optimal control gain to a difference between the target angular velocity and the actual angular velocity of the robot at the present time, and then calculating a required torque that is input to the drive unit of the robot.

In this case, the input step S100 is configured to measure the force applied by the wearing user to the robot, and convert the measured force into the human torque that is applied to the drive joint of the robot. That is, the wearing user will apply a force in a direction in which the user desires to move with the robot worn on the user. At that time, in the input step S100, the force of the wearing user is sensed and is converted into the human torque for the drive joint of the robot, and the human torque is applied to the robot.

Meanwhile, in the targeting step S200, the human torque that is applied to the drive joint of the robot is used as the input of an admittance model and the target angular velocity of the drive joint of the robot is used as the output of the admittance model.

The calculation step S300 may further include the driving step S400 of operating the joint of the robot using both a driving force based on the required torque input to the drive joint of the robot and the human torque applied by the wearing user.

FIG. 1 is a diagram showing the construction of a system for controlling the driving of a wearable robot according to an exemplary embodiment of the present invention. The system for controlling the driving of the wearable robot according to an exemplary embodiment of the present invention includes a drive and measurement unit 500, a sensing unit 100, and a control unit 300. The drive unit of the drive and measurement unit 500 operates the drive joint of the robot, and the measurement unit measures the actual angle and angular velocity of the drive joint of the robot. The sensing unit 100 calculates the human torque applied by a wearing user to the drive joint. The control unit 300 derives the target angular velocity of the robot by applying the calculated human torque to an admittance model, and calculates the required torque that is input to the drive unit of the robot by applying an optimal control gain to a difference between the target angular velocity and the actual angular velocity of the robot.

The control unit 300 includes logic for an admittance model 320, and derives the target angular velocity $\dot{q}_{ref}$ of the robot from the human torque $T_h$. Further, the control unit 300 is provided with an optimal controller 340 and is configured to calculate the required torque $T_a$ that is input to the drive unit of the robot by applying the optimal control gain to the difference between the target angular velocity $\dot{q}_{ref}$ and the actual angular velocity $\dot{q}$ of the robot.

In detail, in the sensing unit of the robot, a sensor capable of measuring a force is installed, and the force intended to be applied by the wearing user is measured using the sensor. The control unit may convert the measured force into the human torque $T_h$, which is applied to each joint of the robot, using a Jacobian transpose.

That is, if it is assumed that five joints are respectively operated by drive motors, the force of the wearing user measured at the end of the robot is converted into torques that are respectively applied to the five joints using the Jacobian transpose. The Jacobian transpose is a matrix for converting the force applied to one end of the robot into torques that act on the respective joints using kinematics. The Jacobian transpose is an academically well-known method, and thus a detailed description thereof will be omitted.

The human torque $T_h$ distributed into the individual joints is applied to the admittance model 320 of the control unit 300, and the target angular velocity $\dot{q}_{ref}$ of a targeted joint is then derived from the admittance model 320. The admittance model can be represented by the following Equation (1):

$$\dot{q}_{ref}(s) = \frac{1}{M_d s + B_d + K_d \frac{1}{s}} T_h(s) \quad (1)$$

where $M_d$: target inertia value
$B_d$: target damping value
$K_d$: target stiffness value
$T_h$: human torque
$\dot{q}_{ref}$: reference value for output angular velocity track In the above Equation, $\dot{q}_{ref}$ denotes the target angular velocity derived from the admittance model. The derived target angular velocity $\dot{q}_{ref}$, together with the actual angular velocity $\dot{q}$ sensed by the drive and measurement unit 500 of the robot, are input to the optimal controller 340. The drive unit of the drive and measurement unit 500 may be implemented as a motor, and the measurement unit may be implemented as a rotatable encoder installed together with the motor. The measurement unit measures the actual angle and angular velocity of the joint drive unit and transfers the measured actual angle and angular velocity to the control unit 300.

The optimal controller 340 of the control unit 300 receives the actual angular velocity, which is fed back from the drive and measurement unit, multiplies a gain K by a value obtained by subtracting the actual angular velocity from the target angular velocity, and then calculates the result of the multiplication as the required torque $T_a$ which is requested from the motor, that is, the drive unit. Further, the drive unit of the drive and measurement unit 500 drives the motor based on the required torque, and the joint of the robot is operated by the above-described human torque $T_h$ applied by the wearing user, together with the required torque. The joint of the robot is moved by both the human force and the driving force of the motor. However, the sensitivity of the robot to the motion of the wearing user can be suitably controlled using a virtual admittance model, and a resistance reaction applied to the wearing user can be minimized, thus reducing fatigue felt by the wearing user when the wearing user drives the robot for a long period of time.

Further, it is possible to derive an optimal control gain value in a plant state using a Linear Quadratic Regulator (LQR) technique. This means that the motor is controlled by receiving the state of the actually driven motor as a feedback signal and compensating for a difference between a target state and the actual state, without being simply driven in consideration of only the request of the wearing user. That is, optimization is realized such that even if a motor having a relatively low specification is used, the desired driving control may be sufficiently performed.

For reference, such an optimal control technique will be described below.

The optimal controller calculates the required torque by multiplying a gain by the difference between the input target angular velocity and the actual angular velocity and by the difference between the target angle and the actual angle. A formula related to this required torque is given by the following Equation (2):

$$T_a = -K \begin{bmatrix} (q_{ref} - q) \\ (\dot{q}_{ref} - \dot{q}) \end{bmatrix} \quad (2)$$

where $T_a$: the driving torque of the motor
K: feedback gain for optimal control
$(q_{ref}-q)$: tracking error in the angle of the joint of the robot
$(\dot{q}_{ref}-\dot{q})$: tracking error in the angular velocity of the joint of the robot Further, the gain K is derived using the optimal control technique and is represented by a first-order differential equation given by the following Equation (3), on the basis of state-space representation from the second-order differential equation of a physical system, $$H(q)\ddot{q}+C(q,\dot{q})+G(q)=\tau \; \dot{x}=Ax+Bu \; y=Cx+Du \quad (3)$$

where x: state vector
y: output vector
u: input vector (control input)
A: state matrix
B: input matrix
C: output matrix
D: feedforward matrix Further, if it is assumed that the input of the control system is u and the output of the control system is x, and then u=−Kx is represented, LQR control can be represented by the following Equation (4):

$$J=\int_0^\infty (x^T Q x + u^T R u) dt$$

where K is given by $K=R^{-1}B^T P$
and P is found by solving the algebraic Riccati equation.

$$A^T P+PA-PBR^{-1}B^T P+Q=0 \quad (4)$$

Therefore, such Q and R as to minimize J are derived, and optimal K is derived based on Q and R, thus enabling control to be performed so that joints can be effectively moved with a minimum number of resources.

According to the method and system for controlling the driving of the wearable robot which have the above-described construction, when the motion of the robot is generated by a wearing user, the sensitivity of the robot to the motion of the wearing user can be suitably controlled via a virtual admittance model, and a resistance reaction applied to the wearing user can be minimized, thus reducing fatigue felt by the wearing user when he or she drives the robot for a long period of time. Further, it is possible to derive an optimal control gain value in a plant state using the optimal control technique based on LQR.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling driving of a wearable robot, comprising:
   a drive unit for operating a drive joint of the robot;
   a measurement unit for measuring an actual angle and an actual angular velocity of the drive joint in the robot;
   a sensing unit for determining a human torque applied by a wearing user to the drive joint; and
   a control unit for determining a target angular velocity of the robot by applying the determined human torque to an admittance model and for determining a required torque that is input to the drive unit of the robot by applying an optimal control gain to a difference between the target angular velocity and the actual angular velocity of the robot.

2. The system according to claim 1, wherein the control unit operates the drive joint of the robot using both a driving force based on the required torque input to the drive joint of the robot and the human torque applied by the wearing user.

* * * * *